W. P. MURPHY.

RELEASE RIGGING.

APPLICATION FILED FEB. 23, 1912.

Reissued Apr. 29, 1913. 13,557.

WITNESSES

G. A. Pauberschmidt

J. M. Wynkoop.

INVENTOR

Walter P. Murphy

By Alvin S. Clarkson Attorney.

UNITED STATES PATENT OFFICE.

WALTER P. MURPHY, OF ST. LOUIS, MISSOURI.

RELEASE-RIGGING.

13,557. Specification of Reissued Letters Patent. Reissued Apr. 29, 1913.

Original No. 1,002,429, dated September 5, 1911, Serial No. 519,471. Application for reissue filed February 23, 1912. Serial No. 679,494.

*To all whom it may concern:*

Be it known that I, WALTER P. MURPHY, a citizen of the United States, and resident of St. Louis, State of Missouri, have invented certain new and useful Improvements in Release-Rigging, of which the following is a description.

The object of my invention is to produce a release rigging that is practical and can be applied to cabooses, tenders, etc., that have no deadwoods, as well as to cars with deadwoods; and with this and minor objects in view my invention consists of the parts and combination of parts as will be more fully hereinafter set out.

Figure 1:
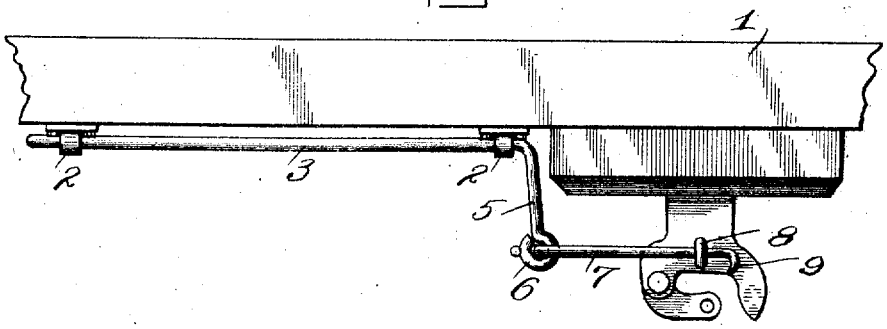
Figure 2:
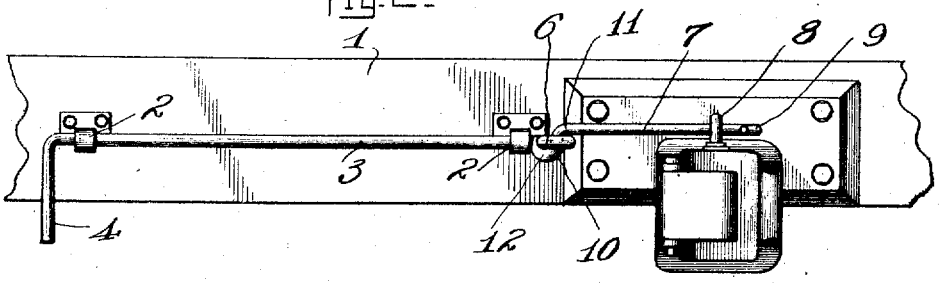
Figure 3:
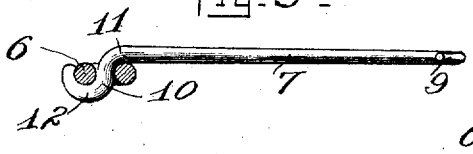
Figure 4:
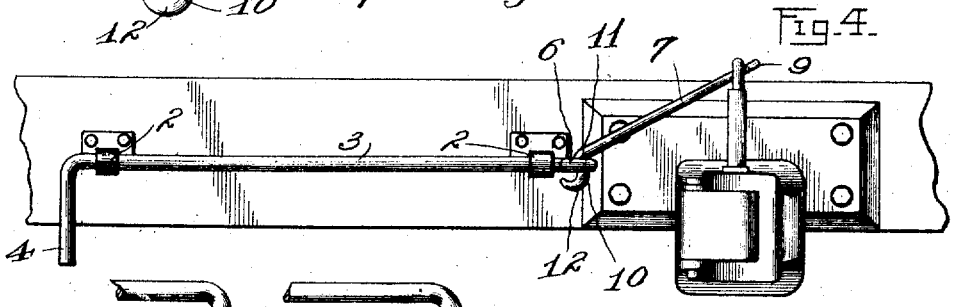
Figure 5:
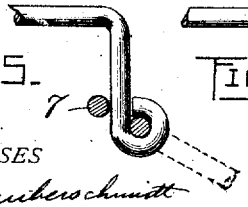
Figure 6:
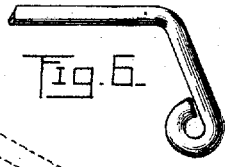

In the drawing, Figure 1 is a top plan view of a car end sill and coupler, parts being broken away, with my improved rigging in position; Fig. 2 is a front elevation of the same; Fig. 3 is a detail view of the pin operating lever and its mounting; Fig. 4 is a front elevation with the locking pin and locking pin lever in elevated position and the hand lever in normal position; and Figs. 5 and 6 are detail views showing different bends in the inner end of the hand lever.

1 represents the end sill of a car which may be of any approved pattern and may or may not have a deadwood, as far as the practicability of my invention is concerned.

2 are suitable bearings secured in any suitable manner to the end sill, in which is loosely journaled the hand operated rod or lever 3, the outer end of which terminates in a handle 4, which extends below the under face of the end sill as shown, in Fig. 2. The inner end of the lever 3 terminates in a crank 5 extending horizontally when the lever 3 is in operative position on the end sill and is at a right angle to the handle 4.

6 is an eye formed on the extreme end of the crank 5, the body forming the eye being formed in the longitudinal axis of the crank while the opening therethrough extends in the vertical or transverse axis.

The pin operating lever 7 is tapered along its main body toward its inner end to adapt it to pass through the eye 8 of the usual locking pin and is of such diameter that the eye 8 may slide freely thereon with minimum friction. The extreme inner end of the lever 7 is bent to form a hook 9, which prevents the lever from becoming accidentally disengaged from the eye 8. The outer end of the pin lifting lever is bent to form a shoulder 11 and still further bent to form a hook 12, by means of which the pin lever 7 is secured to the crank 5 by reason of its engagement with the eye 6; the engagement of one side of the hook 12 with the shoulder 11 and the engagement of the hook 12 with the other side of the eye serves to hold or support the pin lever 7 in a horizontal position normally, as shown in Fig. 2. The two levers may be entirely of commercial bar wrought iron, which is a material consideration from the standpoint of durability and manufacture. This improved release rigging allows the coupler to move in and out sidewise and yet after the locking pin has been raised for lock setting, the handle 4 will drop to its normal vertical position, while the pin lifting lever remains elevated with the pin.

The rod or lever 3 is revolved by means of the handle, which in turn elevates the crank 5, which through the hook 10 and eye 6 elevates the pin lifting lever 7, thereby lifting the locking pin for lock setting or throwing open the knuckle full open. As soon as the operator releases the handle 4, the rod or lever 3 revolves under the weight of the handle, whereby the handle will drop and assume its normal vertical position against the face of the end sill, thus eliminating all danger and damage resulting from the handle being struck by an abutting car. The joint formed by the eye 6 and hook 12, is, for all practical purposes, substantially a universal joint which permits the lever 7 to remain in its elevated position, while the locking pin is held in its elevated position for locksetting, etc., and at the same time permits the handle 4 to return to and remain in its normal vertical position. This rigging may be used on cabooses that must be uncoupled by a chain to hand rail and yet comply with the safety appliance law by being operative outside the rails.

The pin lever 7 is free to move backward, forward and upward independent of any movement of the crank 5. In the event of the coupler falling by reason of damage to the draft rigging, the pin lever 7 will be sustained by its open hook and the eye of the crank against downward position and thereby release the locking pin and uncouple the cars and thus prevent an accident and damage to the cars and roadbed.

In Figs. 5 and 6, I have shown different bends of the inner end of the hand operating lever 3. In Fig. 5, the bend is at a right angle to the main body of the lever. In this construction, the outer end of the pin lever shown in dotted lines is formed in an eye, shown in section. Should the draw bar pull out beyond its normal limit, the eye will impinge against the right angle portion of the hand lever as shown. In Fig. 6, the inner end of the hand operating lever 3, is bent at an angle greater than a right angle.

What I claim is:—

1. A release rigging including a crank having an eye at its inner end, and a lifting pin lever having an open hook at its outer end to engage said eye and form therewith a joint which will permit the crank to return to normal position after operating the pin lever without moving the pin lifting lever from its abnormal position.

2. A release rigging including a hand operated lever having a depending handle at its outer end and a forwardly extending crank at its inner end, the crank having an eye formed at its inner end, a pin lifting lever having an open hook at its outer end to engage the eye of the said crank, whereby the pin lifting lever may be elevated, and remain in such elevated position while the crank and handle of the hand lever are free to return to their normal position.

3. A release rigging including a crank having a horizontally disposed eye on its inner end, and a pin lifting lever having a bent portion at its outer end, said bent portion engaging over one portion and under the other portion of said eye, whereby the pin lever is maintained, normally, in a substantially horizontal position.

In testimony whereof, I have hereunto subscribed my name this 31st day of January, 1912.

WALTER P. MURPHY.

Witnesses:
HARRY W. STANNARD,
JOSEPHINE A. HARTNETT.